Jan. 27, 1970  D. E. FOOTE  3,491,934
BRAZING RING

Filed May 24, 1967  2 Sheets-Sheet 1

Jan. 27, 1970   D. E. FOOTE   3,491,934
BRAZING RING
Filed May 24, 1967   2 Sheets-Sheet 2
Fig. 3.
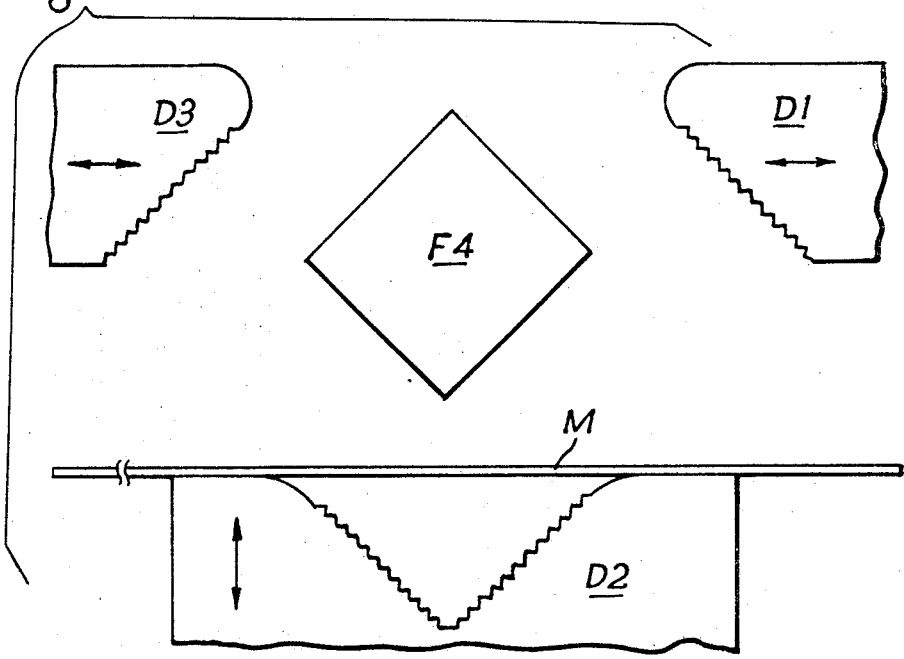
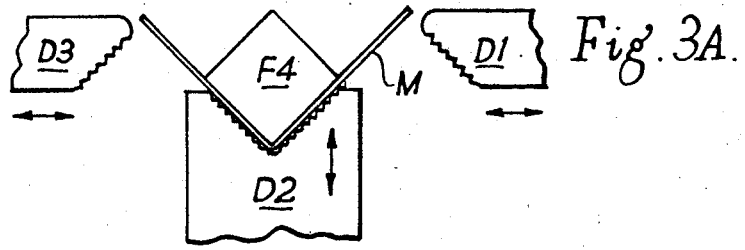
Fig. 3A.
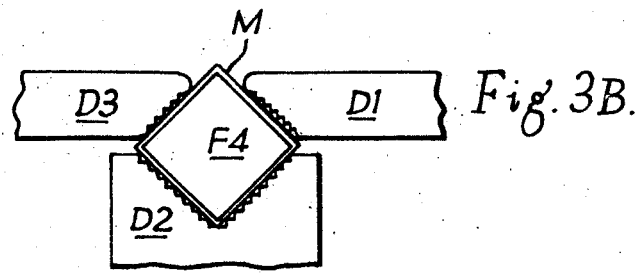
Fig. 3B.

United States Patent Office 3,491,934
Patented Jan. 27, 1970

1

3,491,934
BRAZING RING
Donald Ernest Foote, London, England, assignor to Johnson Matthey & Co. Limited, London, England, a company of Great Britain
Filed May 24, 1967, Ser. No. 640,968
Claims priority, application Great Britain, May 27, 1966, 23,943/66
Int. Cl. B23k *35/14*
U.S. Cl. 228—56    3 Claims

ABSTRACT OF THE DISCLOSURE

This invention relates to split brazing rings in which the outer peripheral region is in a state of compression so that, when heated, the tendency for the split to open is reduced or nullified.

---

This invention relates to brazing rings.

Brazing rings may be made by helically winding wire or strip stock of brazing material on to a former of cylindrical cross-section and then, after stress-relieving the brazing material whilst on the former, making an axially extending cut dividing the wound material into individual convolutions which can then be separately removed from the former. The individual convolutions, which may be regarded as split rings, are usually termed brazing rings. In use, a brazing ring is located between two prepared components to be joined, for example two flanges, and heat applied to melt the brazing ring and thereby from a joint.

Although the brazing rings described above and formed on a cylindrical former must necessarily be circular, brazing rings of different shapes may be made on formers of any desired cross-sectional shape, for example elliptical or rectangular. Moreover, where a limited number of brazing rings are required, individual rings may be made on a former of the required shape from a wire of the required length. Throughout this specification and claims, the term "split brazing ring" is used generically to include a split ring made from wire or strip stock of brazing material and formed into a closed loop so that the ends of the stock material abut against each other.

The use of brazing rings in the way mentioned above saves considerable time when compared with the traditional method using a gas torch and a rod of brazing material. However, brazing rings made by the method outlined above are expensive and, in an attempt to reduce costs, the stress relieving step was omitted and the stock brazing material was annealed prior to winding on the former. This attempt was unsuccessful because, when such rings were heated in use, it was found that the split opened, forming a gap which lead to an unsatisfactory joint.

We have found that the extent to which the split opens can be reduced by placing the outer peripheral region of a brazing ring in compression and, according to this invention there is provided a split brazing ring of the kind described wherein the outer peripheral region of the ring is in a state of compression. The outer peripheral region of a ring may be placed under compression by knurling or otherwise forming indentations in the external periphery of the ring.

The invention also includes a method of making a split brazing ring of the kind described from wire or strip stock of brazing material comprising, placing a region extending longitudinally of the stock in a state of compression, helically winding the stock on to a former of required cross-section so that the region in a state of compression is remote from the former, and, thereafter, making an axially extending cut so as to divide the wound material

2 into individual convolutions which may be removed from the former as split brazing rings. Preferably the method of making a split brazing ring includes forming a plurality of indentations along the length of the stock so as to place the said region in a state of compression. If desired, the indentations may be formed whilst the stock material is on the former.

Where the stock material is wire of circular cross-section, the apices of indentations having pyramidal form lie in a plane passing through the centre line of the wire.

The indentations are preferably formed without removing any material from the ring. Although the indentations may take many different forms we have found that an indentation of pyramidal form produces good results.

Various methods of making split brazing rings in accordance with this invention will now be described by way of example with reference to the accompanying drawings, in which.

FIGURES 3, 3A and 3B respectively show steps during the formation of a split brazing ring of rectangular shape.

Figure 1:
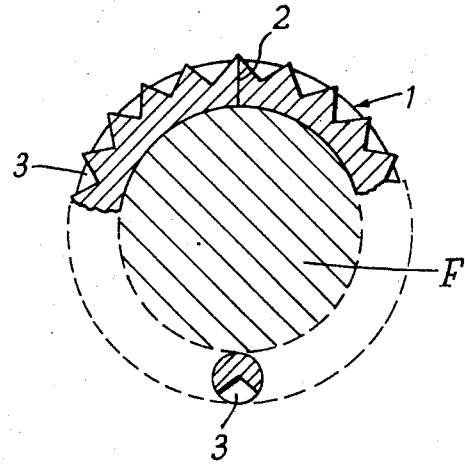
FIGURE 1 is a section taken through a circular brazing ring.

FIGURE 1 shows a brazing ring 1 which is split at 2 and bears pyramidal indentation 3 around its periphery.

The brazing ring 1 shown in the drawing may be made by helically winding brazing material of circular cross-section on to a cylindrical former F. Prior to, or during winding, the brazing material is knurled to form pyramidal indentations 3 in what will ultimately be the outer periphery of a ring.

Finally, the helically wound material is separated into individual convolutions (split brazing rings) by cutting through the material whilst on the former and in direction generally axially relative to the former.

Figure 2:
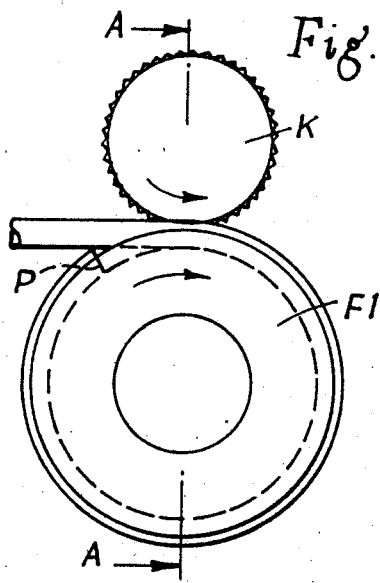
FIGURE 2 is an end view showing part of an apparatus for forming circular split brazing rings.
Figure 2A:
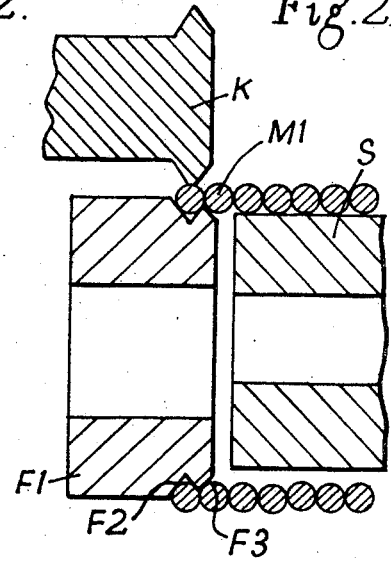
FIGURE 2A is a section taken on line AA of FIGURE 2.

The apparatus shown in FIGURES 2 and 2A has a former F1 of circular cross-section which is freely rotatable on a shaft not shown. An annular and V-shaped groove F2 is formed towards one end of the former and the said end is bevelled at F3. Mounted in line with the former F1 is a cylindrical support S of smaller diameter than the former F1 and, as shown in FIGURE 2A, the axes of F1 and S are displaced for a purpose to be later described.

A driven knurling wheel K is mounted for rotation about an axis which is parallel to the former F1.

In operation of the apparatus of FIGURES 2 and 2A, a free end E of stock brazing material M of wire form and circular cross-section is introduced into a nip formed between the former F1 and the knurling wheel K. As the knurling wheel is driven anti-clockwise in FIGURE 2, the wire M is forced into the V groove F2. The knurling wheel K fulfills two functions, namely to drive the material through the nip and place the outer periphery of the ultimate brazing ring in a state of compression. When the free end E of brazing material M approaches a position P (FIGURE 2), it is manually or mechanically displaced from the groove on to the bevel F3 whereupon continued rotation of the knurling wheel K feeds wire material M from the groove on to the support S where the material M assumes a helical form. As shown in FIGURE 2A the axis of the support S is displaced upwardly relative to the axis of the former F1 a distance sufficient to provide adequate support for the helix. When a helix having a length of say twelve inches has been formed, a cut is made through the material at say M1 and the helix removed. To separate the individual convolutions of the helix to form split brazing rings a generally axially extending cut is made through the helix whilst on the former.

FIGURES 3, 3A and 3B show the stages in the formation of a split brazing ring of rectangular form. An apparatus for forming such rings includes a former F4 and three displaceable members D1, D2 and D3 having saw tooth forming surfaces as shown.

In operation, a length of stock brazing material M is laid, as shown, across displaceable member D2 which is then displaced into the position shown in FIGURE 3A. Thereafter, simultaneously or in sequence displaceable members D1 and D3 are displaced towards the former to complete the formation of a rectangular split brazing ring. The saw tooth forming surfaces of the displaceable members create indentations in the outer periphery of the ring placing the outer periphery in a state of compression.

What I claim is:

1. A split brazing ring formed from a resilient brazing metal the outer peripheral region thereof having a series of indentations to provide a state of compression in said region whereby, on heating the ring to brazing temperature, the resulting tendency which the ring would otherwise exercise to expand and form a gap between the ends of the ring adjacent the gap is substantially compensated by the state of compression of the outer region.

2. A ring according to claim 1 wherein the indentations are of pyramidal form.

3. A split brazing ring as claimed in claim 1 wherein the ring has a rectangular form.

References Cited

UNITED STATES PATENTS

| | | | |
|---|---|---|---|
| 2,471,650 | 5/1949 | Pandolfi | 228—56 |
| 3,333,047 | 7/1967 | Geoffroi | 228—56 |

JOHN F. CAMPBELL, Primary Examiner

R. J. CRAIG, Assistant Examiner

U.S. Cl. X.R.

174—94; 206—56